(12) United States Patent
Vanderheyden et al.

(10) Patent No.: US 7,334,750 B2
(45) Date of Patent: Feb. 26, 2008

(54) TAPE DRIVE WITH LEADER CONNECTING MECHANISM

(75) Inventors: William Vanderheyden, Loveland, CO (US); Phillip M. Morgan, Berthoud, CO (US); John D. Willems, Jr., Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 355 days.

(21) Appl. No.: 10/913,204

(22) Filed: Aug. 6, 2004

(65) Prior Publication Data

US 2005/0253009 A1 Nov. 17, 2005

Related U.S. Application Data

(63) Continuation-in-part of application No. 10/844,844, filed on May 13, 2004, now Pat. No. 7,239,474.

(51) Int. Cl.
G11B 15/66 (2006.01)
(52) U.S. Cl. .............................. 242/332.4; 242/332.7; 360/85; 360/95
(58) Field of Classification Search ............. 242/332.4, 242/332.7; 360/85, 95
See application file for complete search history.

(56) References Cited

U.S. PATENT DOCUMENTS

| 4,546,396 A | 10/1985 | Schatteman |
| 4,662,049 A | 5/1987 | Hertrich |
| 4,720,913 A | 1/1988 | Hertrich |
| 5,769,346 A | 6/1998 | Daly |
| 6,135,379 A | 10/2000 | Argumedo |
| 6,278,572 B1 | 8/2001 | Kletzl et al. |
| 6,311,915 B1 | 11/2001 | Rathweg |
| 6,364,232 B1 * | 4/2002 | Nemeth et al. .......... 242/332.4 |
| 6,433,953 B1 | 8/2002 | Taki et al. |
| 6,471,150 B1 | 10/2002 | Tsuchiya et al. |
| 6,568,618 B1 | 5/2003 | Vanderheyden |
| 6,592,063 B2 | 7/2003 | Tatsumi et al. |
| 6,883,739 B2 | 4/2005 | Ojima |
| 6,991,193 B2 | 1/2006 | Kurokawa |
| 2005/0092858 A1 | 5/2005 | Kurokawa et al. |

FOREIGN PATENT DOCUMENTS

| EP | 0143598 A | 6/1985 |
| WO | WO 83/04453 A | 12/1983 |
| WO | WO 98/44499 A | 10/1998 |

* cited by examiner

Primary Examiner—John Q. Nguyen
(74) Attorney, Agent, or Firm—Brooks Kushman P.C.

(57) ABSTRACT

A tape drive for use with a tape cartridge having a cartridge leader includes a drive body, a take-up reel supported by the drive body, and a drive leader connected to the take-up reel. The tape drive further includes a leader connecting mechanism for connecting the drive leader to the cartridge leader, and an elevator assembly configured to receive the tape cartridge and to position the tape cartridge with respect to the drive body. The elevator assembly is also configured to actuate the leader connecting mechanism.

20 Claims, 8 Drawing Sheets

TAPE DRIVE WITH LEADER CONNECTING MECHANISM

CROSS-REFERENCE TO RELATED APPLICATIONS

This application is a continuation-in-part of U.S. application Ser. No. 10/844,844 filed May 13, 2004 now U.S. Pat. No. 7,239,474.

BACKGROUND OF THE INVENTION

1. Field of the Invention

The invention relates to a tape drive having a leader connecting mechanism.

2. Background Art

A tape drive may include a mechanism for connecting a drive leader to a cartridge leader of a tape cartridge. Examples of such mechanisms are disclosed in U.S. Pat. Nos. 4,662,049; 4,720,913; 5,769,346 and 6,311,915.

Another known tape drive includes a threading mechanism having a leader block that is engageable with a pin of a tape cartridge. The tape drive further includes an elevator mechanism for raising and lowering the tape cartridge. Moreover, the elevator mechanism is configured to actuate the threading mechanism.

SUMMARY OF THE INVENTION

Under the invention, a tape drive is provided for use with a tape cartridge having a cartridge leader. The tape drive includes a drive body, a take-up reel supported by the drive body, and a drive leader connected to the take-up reel. The tape drive further includes a leader connecting mechanism for connecting the drive leader to the cartridge leader, and an elevator assembly configured to receive the tape cartridge and to position the tape cartridge with respect to the drive body. The elevator assembly is also configured to actuate the leader connecting mechanism.

DETAILED DESCRIPTION OF THE PREFERRED EMBODIMENT(S)

Figure 1:
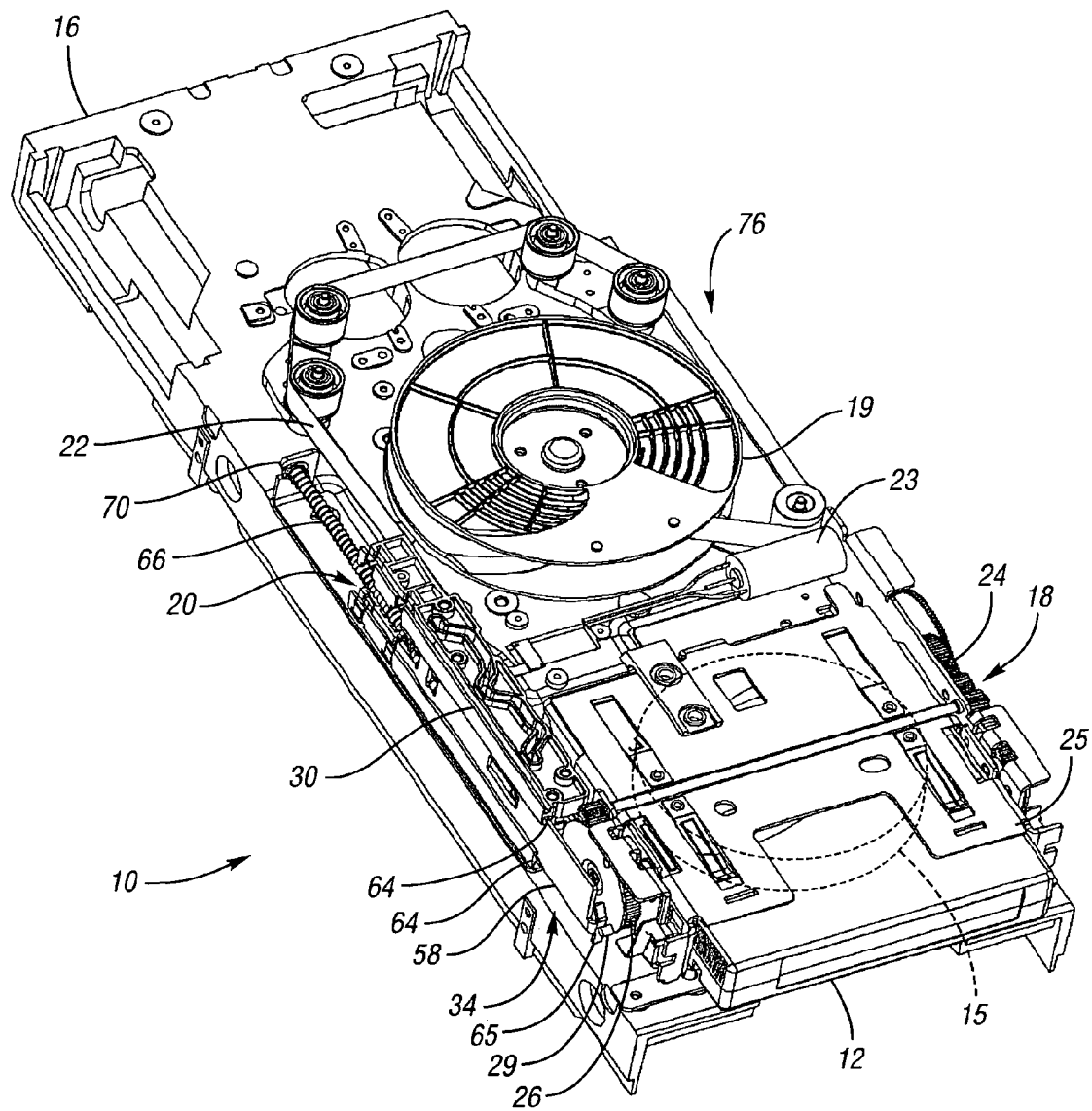
FIG. 1 is a perspective view of a tape cartridge and a tape drive according to the invention, wherein the tape drive includes a leader connecting mechanism and an elevator assembly.
Figure 2:
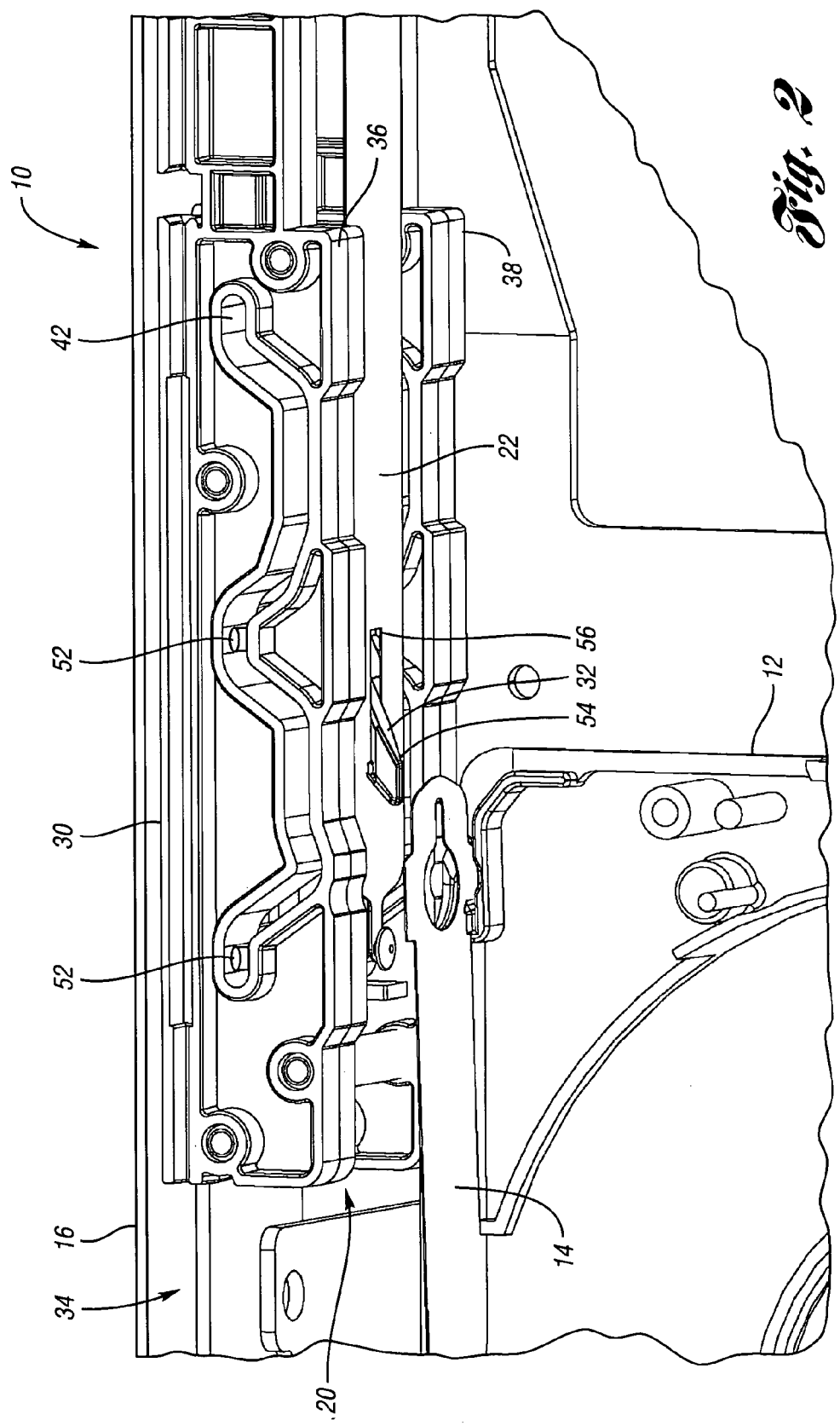
FIG. 2 is a perspective view of the leader connecting mechanism of the tape drive, showing an engaging member of the leader connecting mechanism in an initial position, and a tape leader of the tape drive disengaged from a cartridge leader of the tape cartridge.

FIGS. 1 and 2 show a tape drive 10 according to the invention. The tape drive 10 is configured to receive a tape cartridge 12 having a cartridge leader 14 attached to a length of magnetic tape (not shown), which is wound on a supply reel 15. The tape drive 10 is further configured to perform read and/or write operations on the magnetic tape of the tape cartridge 12.

The tape drive 10 includes a drive body, such as a housing 16, for receiving the tape cartridge 12, and an elevator assembly 18 supported by the housing 16 for moving the tape cartridge 12 with respect to the housing 16. The tape drive 10 further includes a take-up reel 19 and a leader connecting mechanism 20, such as a buckling mechanism, for connecting a drive leader 22 of the tape drive 10 to the cartridge leader 14, so that the drive leader 22 may route the cartridge leader 14 through the tape drive 10 to the take-up reel 19, as explained below in detail.

While the elevator assembly 18 may have any suitable configuration, in the embodiment shown in FIG. 1, the elevator assembly 18 includes a motor 23, a gear train 24 connected to the motor 23, and a shuttle 25 associated with the gear train 24 and configured to receive the tape cartridge 12. Furthermore, the elevator assembly 18 is configured to move the tape cartridge 12 with respect to the housing 16. For example, the elevator assembly 18 may be used to raise and/or lower the tape cartridge 12 with respect to the housing 16. More specifically, referring to FIGS. 1 and 3, the gear train 24 may include a gear or cam 26 having a cam slot 27 that engages a projection 28, such as a pin, on the shuttle 25. Rotation of the cam 26 in a first direction, such as clockwise, may lower the shuttle 25 with respect to the housing 16, and rotation of the cam 26 in an opposite second direction may raise the shuttle 25.

The elevator assembly 18 may also be used to actuate the leader connecting mechanism 20. For example, the cam 26 of the gear train 24 may have an engaging portion, such as a post 29, that is engageable with the leader connecting mechanism 20 for moving a portion of the leader connecting mechanism 20, as explained below in detail.

Figure 4:
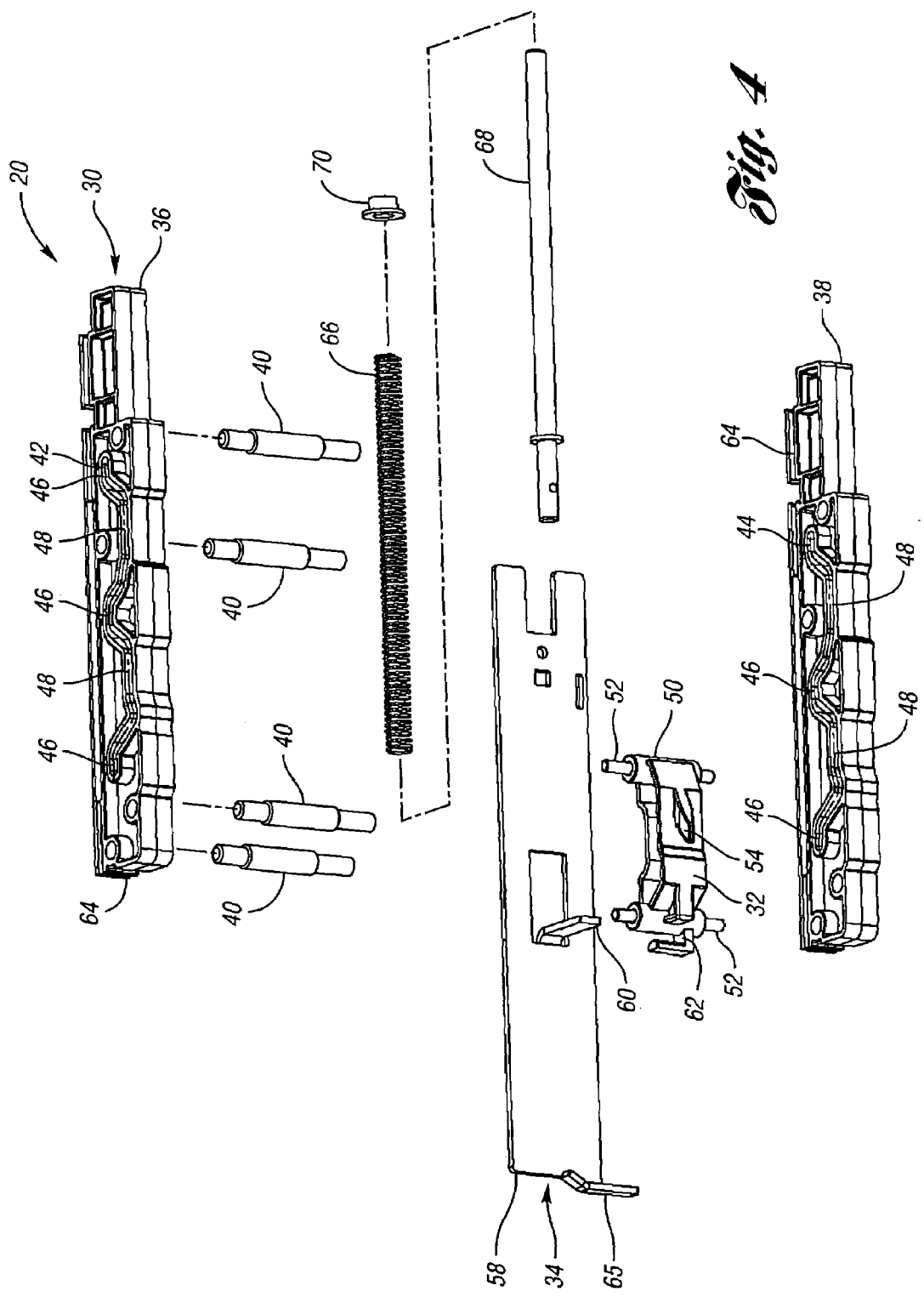
FIG. 4 is an exploded perspective view of the leader connecting mechanism.
Figure 5:
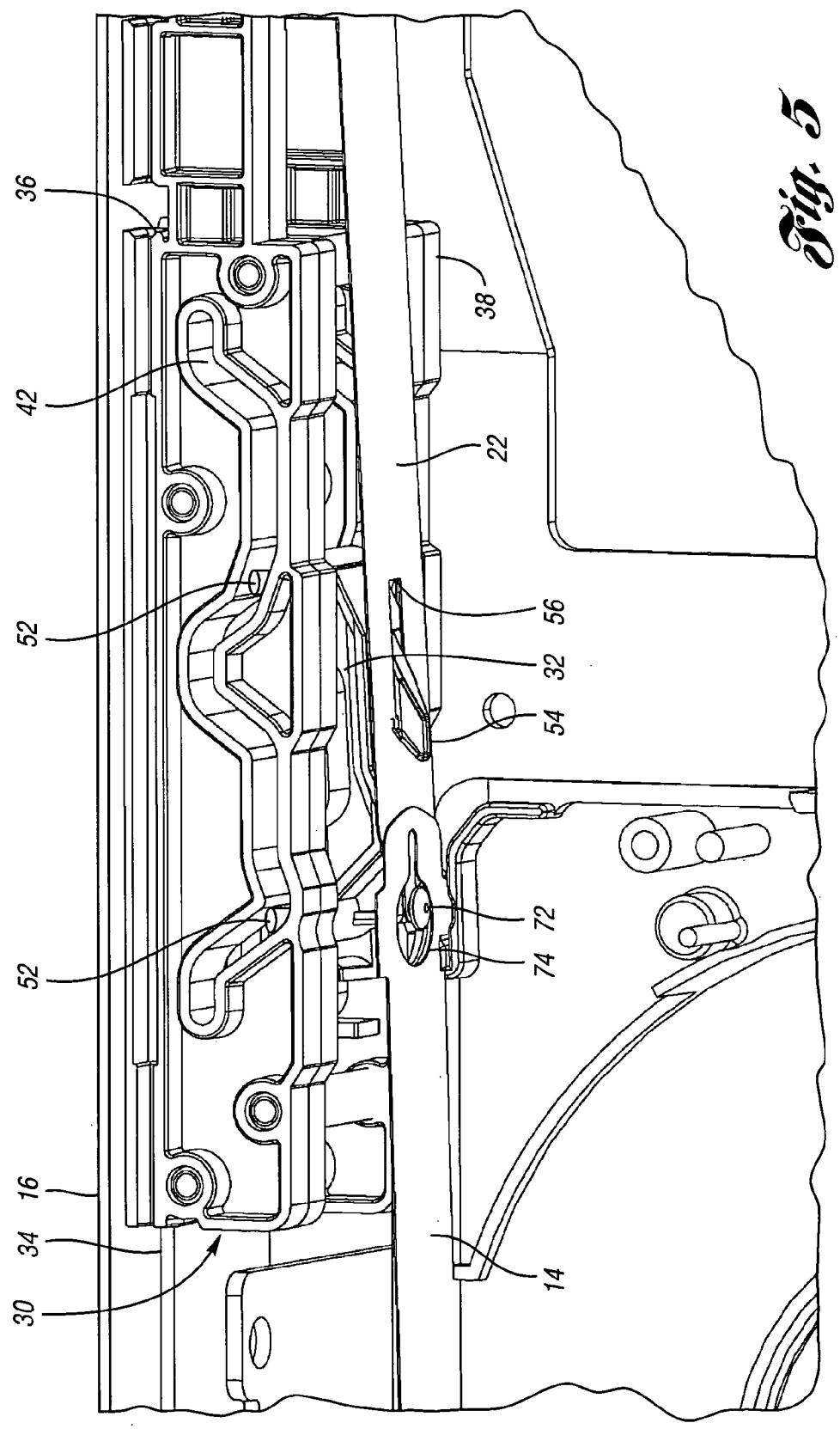
FIG. 5 is a perspective view of the leader connecting mechanism with the engaging member moved to an intermediate position.

The leader connecting mechanism 20 may have any suitable configuration for connecting the cartridge leader 14 to the drive leader 22. Referring to FIGS. 1, 2 and 4, for example, the leader connecting mechanism 20 may include a guide member 30 supported by the housing 16, a coupling member or engaging member 32 that is engageable with the drive leader 22 and moveable with respect to the guide member 30, and a drive arrangement 34 that is engageable with the engaging member 32. In one embodiment of the invention, the guide member 30 is fixed to the housing 16 in any suitable manner, such as with adhesive and/or fasteners, and includes first and second sections 36 and 38, respectively, that are connected together with fasteners, such as posts 40. The first and second sections 36 and 38, respectively, have first and second guide tracks 42 and 44, respectively, for guiding movement of the engaging member 32. The tracks 42 and 44 are substantially similar and may be configured to vary the angular orientation of the engaging member 32 as the engaging member 32 translates along the tracks 42 and 44. While the tracks 42 and 44 may have any suitable configuration, in the embodiment shown in FIG. 4, each track 42 and 44 has a non-linear configuration having multiple peaks 46 and valleys 48.

The engaging member 32 may have any suitable configuration such that the engaging member 32 is slidable along the tracks 42 and 44. For example, the engaging member 32 may include a main body 50 and one or more projections 52 that extend from the main body 50 and that are engageable with the tracks 42 and 44. The engaging member 32 further includes an engaging portion 54, such as a hook or other projection, that is engageable with an aperture 56 formed in the drive leader 22.

Alternatively, the engaging portion 54 may have any suitable configuration for engaging the drive leader 22. For example, the engaging portion 54 may be an aperture that is configured to receive a projection on the drive leader 22.

The drive arrangement 34 includes a drive member 58 that is engageable with the engaging member 32 for moving the engaging member 32 along the guide member 30. In the embodiment shown in FIG. 3, the drive member 58 includes an engaging portion, such as tab 60, that is configured to be received in a slot 62 of the engaging member 32.

The drive member 58 may also be configured to slide along the guide member 30. For example, the drive member 58 may slide along additional guide tracks 64 formed in the guide member 30. While the tracks 64 may have any suitable configuration, in the embodiment shown in the Figures, the tracks 64 are generally linear.

The drive member 58 may be driven in any suitable manner and by any suitable mechanism. In the embodiment shown in the FIG. 1, for example, the drive member 58 is driven by the elevator assembly 18. More specifically, upon rotation of the cam 26, the post 29 of the cam 26 engages a tab 65 on the drive member 58 and urges the drive member 58 along the guide member 30.

As another example, the drive member 58 may be driven by a motor and gear train or other drive assembly (not shown) that are separate from the elevator assembly 18.

In addition, the drive arrangement 34 may include a biasing member, such as a spring 66, for urging the drive member 58 toward a home position shown in FIGS. 1 and 2. Referring to FIGS. 1 and 4, the spring 66 may be positioned on a rod 68 that is attached to the drive member 58 and moveable through a bushing 70, which is attached to the drive body 16.

Figure 3:
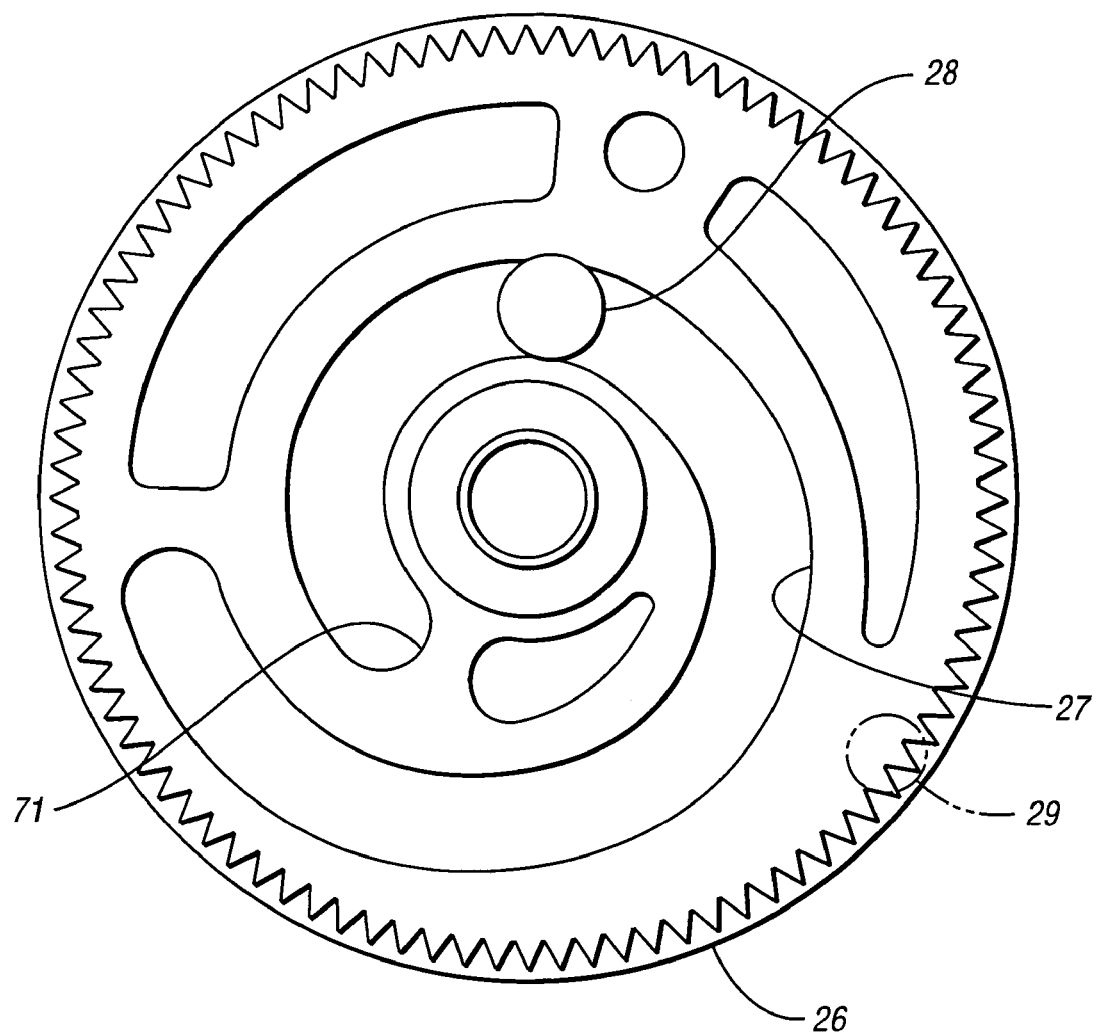
FIG. 3 is a cross-sectional view of a cam and projection of the elevator assembly.

Referring to FIGS. 1-7, operation of the tape drive 10 will now be described. First, the tape cartridge 12 may be inserted into the tape drive 10 either manually or automatically. Next, the elevator assembly 18 may be used to lower the tape cartridge 12 onto a drive motor (not shown) of the tape drive 10. Referring to FIGS. 1 and 3, for example, the cam 26 may be rotated in the first direction such that the projection 28 of the shuttle 25 moves from a raised position to a lowered position shown in FIG. 3, to thereby move the shuttle 25 and tape cartridge 12 from a raised position to a lowered position shown in FIG. 1. Once the tape cartridge 12 is in the lowered position, the elevator assembly 18 may continue to operate, thereby causing the cam 26 to continue to rotate in the first direction into engagement with the drive member 58.

Because the radius of the cam slot 27 remains generally constant from the location of the projection 28 shown in FIG. 3 to an end 71 of the cam slot 27, continued rotation of the cam 26 in the first direction will not cause further lowering of the shuttle 25 and tape cartridge 12. However, continued rotation of the cam 26 in the first direction causes the drive member 58 to move away from the home position shown in FIGS. 1 and 2. As a result, the drive member 58 causes the engaging member 32 to move from an initial position, shown in FIG. 2, toward a final position, shown in FIG. 7.

As the engaging member 32 translates toward the final position, the tracks 42 and 44 cause the engaging member 32 to move toward the cartridge leader 14. Upon reaching an intermediate position shown in FIG. 5, the engaging member 32 is configured to position the drive leader 22 for coupling engagement with the cartridge leader 14. For example, the engaging member 32 may be configured to move laterally with respect to the guide member 30, as the engaging member 32 moves toward the intermediate position, to thereby cause a button 72 of the drive leader 22 to extend into an opening 74 of the cartridge leader 14.

Figure 6:
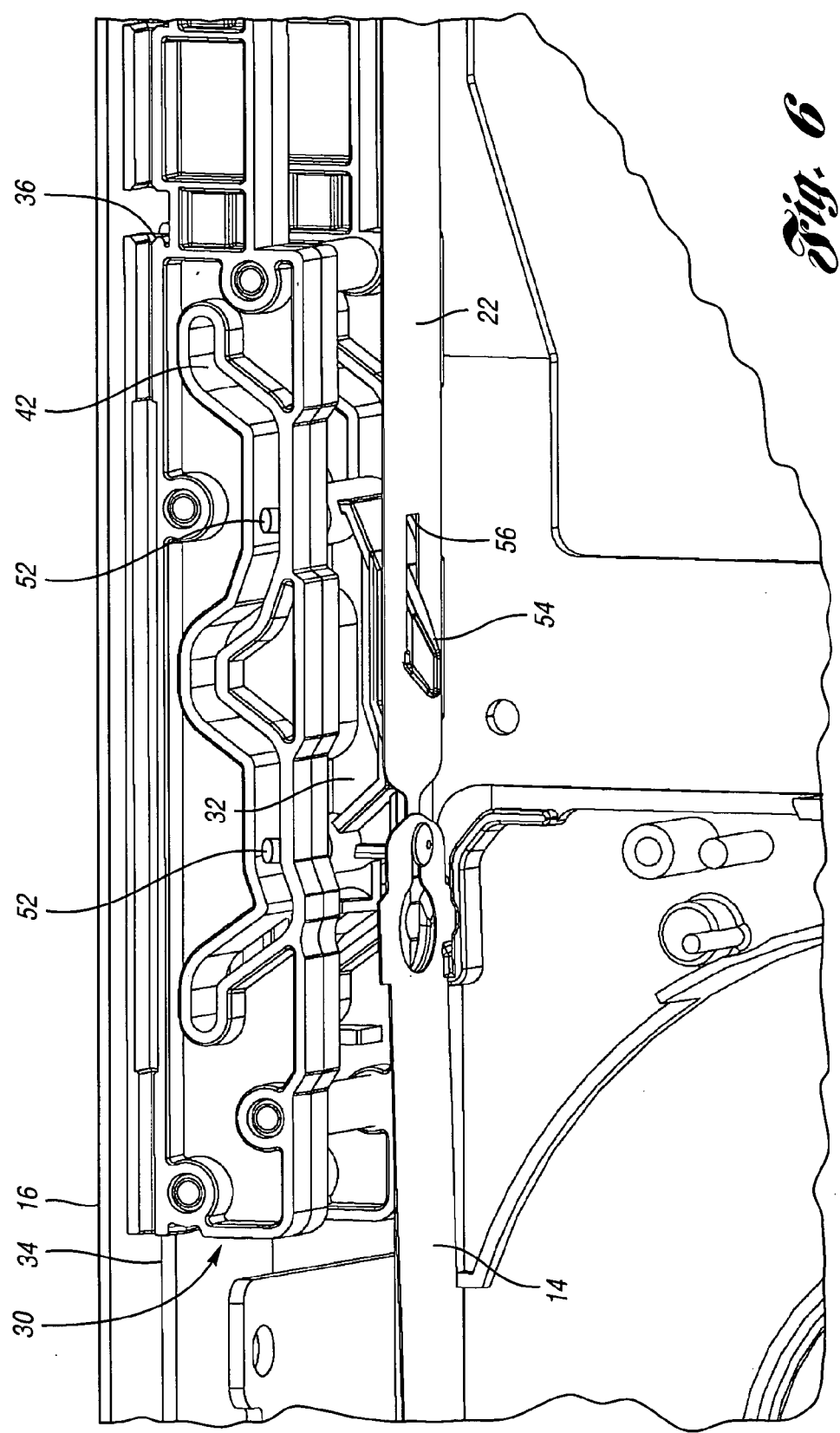
FIG. 6 is a perspective view of the leader connecting mechanism showing the drive leader fully coupled to the tape leader.
Figure 7:
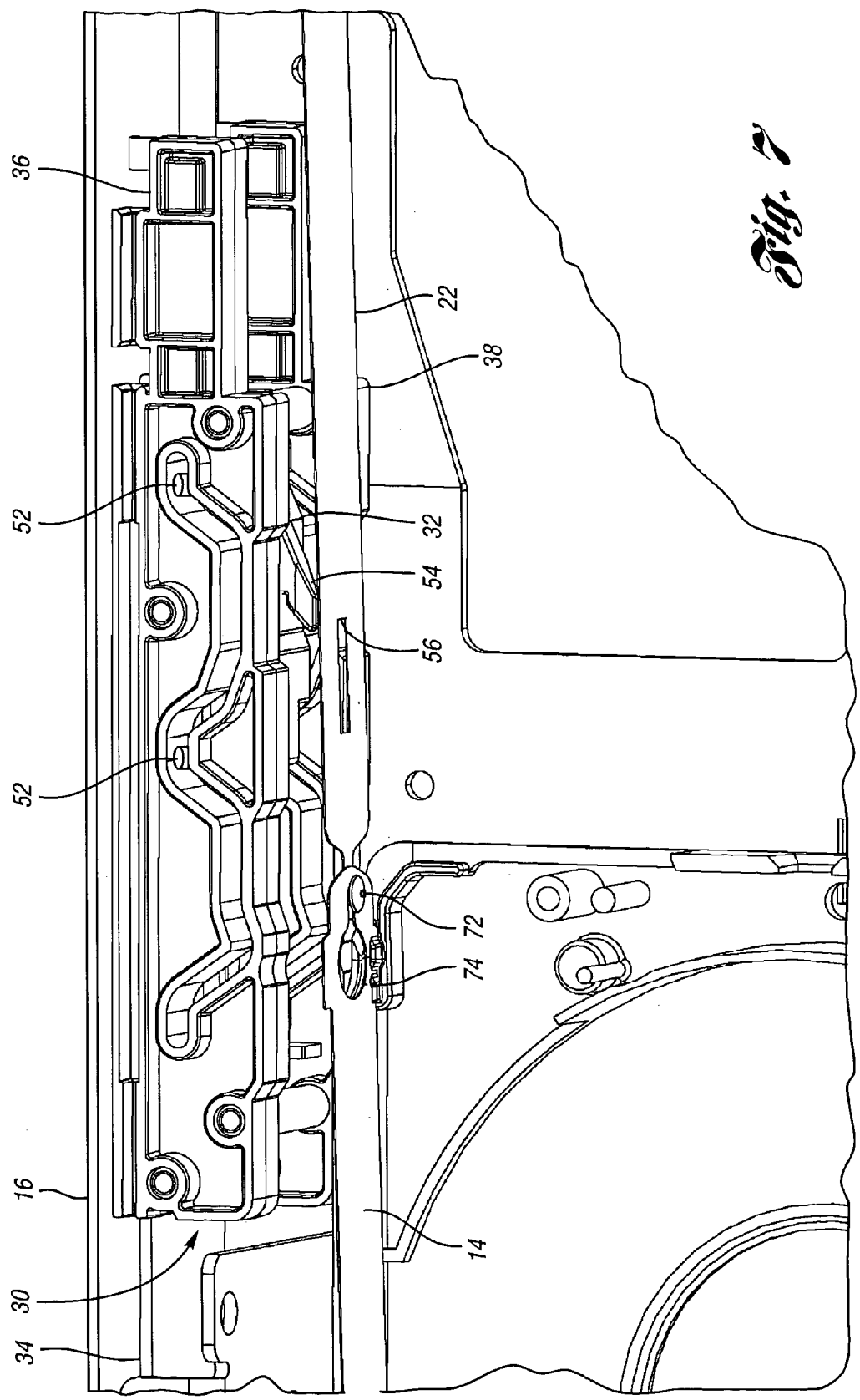
FIG. 7 is a perspective view of the leader connecting mechanism with the engaging member moved to a final position.

Continued movement of the engaging member 32 and drive leader 22 may allow the button 72 to fully engage the opening 74, thereby coupling the drive leader 22 to the cartridge leader 14, as shown in FIG. 6. Further movement of the engaging member 32 toward the final position causes the engaging member 32 to move laterally away from the cartridge leader 14, as shown in FIG. 7. Because the drive leader 22 is now coupled to the cartridge leader 14, this movement of the engaging member 32 also causes the engaging portion 54 to disengage the aperture 56, thereby releasing the drive leader 22 from the engaging member 32.

Alternatively, the leaders 14 and 22 may have any suitable configuration that enables the leaders 14 and 22 to be coupled together. For example, the drive leader 22 may include an opening for receiving a button or other projection of the cartridge leader 14.

Once coupled to the cartridge leader 14, the drive leader 22 may then be used to route the cartridge leader 14 and magnetic tape (not shown) of the tape cartridge 12 through a tape path 76 to the take-up reel 19 of the tape drive 10. More specifically, the take-up reel 19, which is connected to the drive leader 22, may be rotated to draw the drive leader 22 and cartridge leader 14 through the tape path 76. As a result, the drive leader 22 and cartridge leader 14 may be wound onto the take-up reel 19. Next, the tape drive 10 may be used to perform read and/or write operations on the magnetic tape.

The drive motor (not shown) disposed beneath the tape cartridge 12 may then be used to rewind the magnetic tape onto the supply reel 15. Next, the cam 26 may be rotated in the second direction opposite the first direction, to thereby allow the engaging member 32 to return to the initial position shown in FIGS. 1 and 2. As mentioned above, the spring 66 may be used to urge the drive member 58 toward the home position, thereby urging the engaging member 32 toward the initial position. As the engaging member 32 moves toward the initial position, the engaging portion 54 may engage the drive leader 22 and disengage the drive leader 22 from the cartridge leader 14.

The initial and final positions of the engaging member 32 may be established in any suitable manner. For example, the initial position may be established by engagement of the rod 68 with one of the posts 40. As another example, the initial position and/or final position may be established by engagement of one of the projections 52 with an end of one of the tracks 42 or 44. As yet another example, one or more sensors may be used to control operation of the motor 23 to thereby stop movement of the cam 26 when the engaging member 32 has reached a desired position.

With the above configuration, longitudinal, lateral and angular movement of the engaging member 32 may be effectively controlled by the guide member 30. As a result, improved leader connection reliability may be achieved.

Furthermore, the leaders 14 and 22 may have any suitable configuration and may be made of any suitable material. For example, the leaders 14 and 22 may each have a thin, elongated configuration and may be made of a flexible material, such as polyethylene, that is configured to be wound onto the take-up reel 19. In one embodiment, each leader 14 and 22 has a thickness that is at least ten times greater than the thickness of the magnetic tape. For example, each leader 14 and 22 may have a thickness in the range of 0.0050 to 0.0075 inches, while the magnetic tape may have a thickness of approximately 0.00025 inches.

Figure 8:
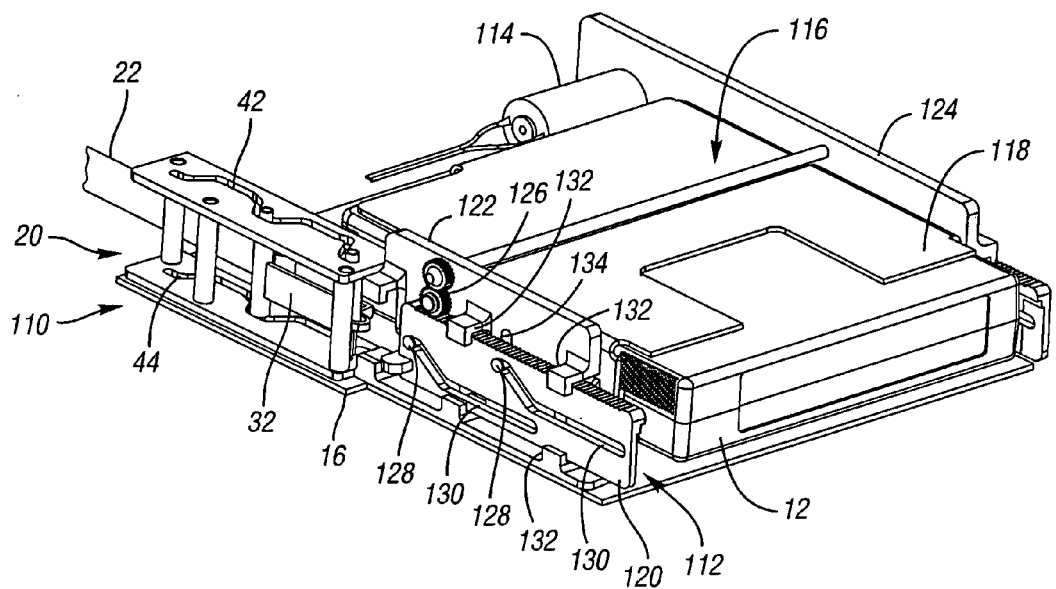
FIG. 8 is a perspective view of a second embodiment of a tape drive according to the invention showing an alternative elevator assembly with a shuttle in a raised position.
Figure 9:
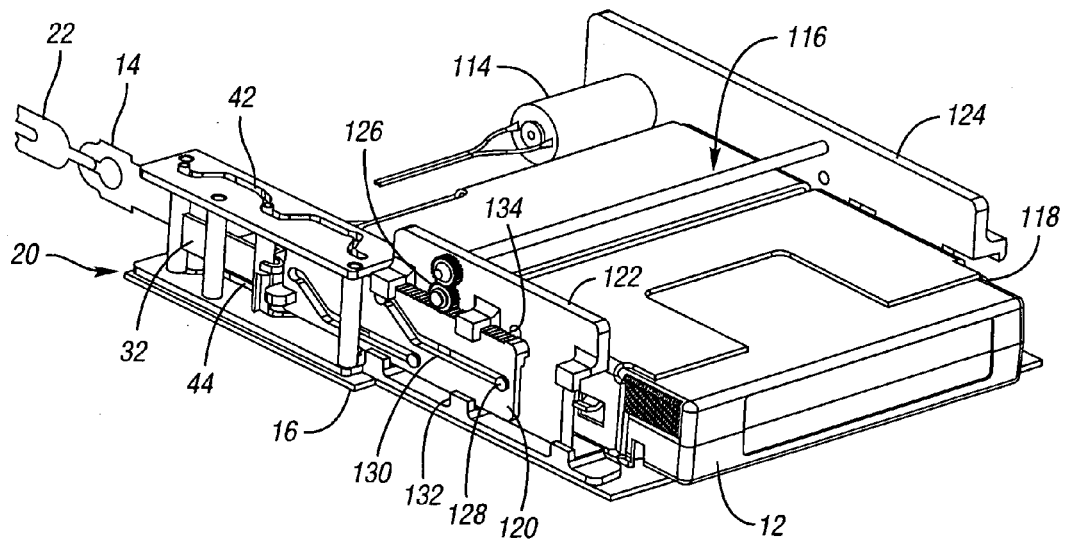
FIG. 9 is a perspective view of the tape drive of FIG. 8 showing the shuttle in a lowered position.

FIGS. 8 and 9 show a second embodiment 110 of a tape drive according to the invention. Similar components of the tape drive 10 and tape drive 110 are identified with the same reference numbers.

The tape drive 110 includes an alternative elevator assembly 112 for moving tape cartridge 12 and for actuating leader connecting mechanism 20. The elevator assembly 112 includes a motor 114, a gear train 116 connected to the motor 114, a shuttle 118 associated with the gear train 116 and configured to receive the tape cartridge 12, and a drive member 120 associated with the gear train 116 and the shuttle 118. The elevator assembly 112 further includes first and second brackets 122 and 124, respectively, disposed on opposite sides of the shuttle 118.

As with the elevator assembly 18, the elevator assembly 112 is configured to move the tape cartridge 12 with respect to housing 16. For example, the elevator assembly 112 may be used to raise and/or lower the tape cartridge 12 with respect to the housing 16. More specifically, the gear train 116 may include a gear 126 that is driven by the motor 114 and engageable with teeth on the drive member 120 for moving the drive member 120 between a first position shown in FIG. 8 and a second position shown in FIG. 9. As the gear 26 rotates in a first direction, such as clockwise, the drive member 120 moves from the first position to the second position. Furthermore, one or more projections 128 of the shuttle 118 slide along one or more guide slots 130 formed in the drive member 120, thereby causing the shuttle 118 and tape cartridge 12 to move from a raised position shown in FIG. 8 to a lowered position shown in FIG. 9. Similarly, when the gear 26 is rotated in a second direction opposite the first direction, the drive member 120 moves from the second position to the first position, thereby causing the shuttle 118 and tape cartridge 12 move from the lowered position to the raised position.

The first bracket 122 may include one or more guide tabs 132 for guiding movement of the drive member 120. Furthermore, the projections 128 of the shuttle 118 may extend through one or more slots 134 formed in the first bracket 122.

The drive member 120 is also engageable with the leader connecting mechanism 20 for actuating the leader connecting mechanism 20. For example, the drive member 120 may be engageable with the engaging member 32 for sliding the engaging member 32 along the tracks 42 and 44 from an initial position shown in FIG. 8 to a final position shown in FIG. 9. When the drive member 120 moves from the first position shown in FIG. 8 to the second position shown in FIG. 9, the drive member 120 may cause the leader connecting mechanism 20 to connect the drive leader 22 with the cartridge leader 14, as described above with respect to the tape drive 10 (the drive leader 22 and cartridge leader 14 are shown connected together and moved away from the leader connecting mechanism 20 in FIG. 9).

When the gear 126 is rotated in the second direction, drive member 120 is moved from the second position to the first position, thereby allowing the engaging member 32 to return to the initial position shown in FIG. 8. For example, the drive member 120 may pull the engaging member 32 toward the initial position. As another example, a spring may be used to urge the engaging member 32 toward the initial position. As the engaging member 32 moves toward the initial position, the engaging member 32 may engage the drive leader 22 and disengage the drive leader 22 from the cartridge leader 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape drive for use with a tape cartridge having a cartridge leader, the tape drive comprising:
   a drive body;
   a take-up reel supported by the drive body;
   a drive leader connected to the take-up reel, the drive leader being engageable with the cartridge leader;
   a leader connecting mechanism supported by the drive body for connecting the drive leader to the cartridge leader; and
   an elevator assembly for receiving the tape cartridge and for positioning the tape cartridge with respect to the drive body, the elevator assembly further being configured to actuate the leader connecting mechanism;
   wherein the drive leader is connected to the take-up reel prior to the drive leader being connected to the cartridge leader by the leader connecting mechanism.

2. The tape drive of claim 1 wherein the elevator assembly includes a gear rotatably supported by the drive body, the gear including an engaging portion that is engageable with the leader connecting mechanism for actuating the leader connecting mechanism.

3. The tape drive of claim 2 wherein the leader connecting mechanism includes a guide member supported by the drive body, an engaging member that is engageable with the drive leader and moveable with respect to the guide member for connecting the drive leader with the cartridge leader of the tape cartridge, and a drive member that is engageable with the engaging member for moving the engaging member with respect to the guide member, and wherein the gear is engageable with the drive member for moving the drive member with respect to the drive body.

4. The tape drive of claim 3 wherein the drive member is configured to move generally linearly along the guide member.

5. The tape drive of claim 2 wherein the leader connecting mechanism includes a guide member supported by the drive body and having a track, an engaging member that is engageable with the drive leader and slidable along the track of the guide member for connecting the drive leader with the cartridge leader of the tape cartridge, and a drive member that is engageable with the engaging member for sliding the engaging member along the track, and wherein the gear is engageable with the drive member for moving the drive member with respect to the drive body.

6. The tape drive of claim 5 wherein the guide member includes an additional track for guiding movement of the drive member, and the drive member is slidable along the additional track.

7. The tape drive of claim 1 wherein the elevator assembly includes a shuttle for receiving the tape cartridge, and a drive member that is moveable with respect to the shuttle, the drive member being engageable with the leader connecting mechanism for actuating the leader connecting mechanism.

8. The tape drive of claim 7 wherein the leader connecting mechanism includes a guide member supported by the drive body and having a track, and an engaging member that is engageable with the drive leader and slidable along the track of the guide member for connecting the drive leader with the cartridge leader of the tape cartridge, and wherein the drive member is engageable with the engaging member for sliding the engaging member with respect to the guide member.

9. The tape drive of claim 8 wherein the drive member includes a guide slot, and the shuttle includes a projection that extends into the slot and is slidable with respect to the slot.

10. The tape drive of claim 9 wherein the elevator assembly includes a bracket disposed proximate the shuttle, the bracket including a guide tab for guiding movement of the drive member, and wherein the projection of the shuttle extends through the bracket.

11. The tape drive of claim 7 wherein the leader connecting mechanism includes a guide member supported by the drive body, and an engaging member that is engageable with the drive leader and moveable with respect to the guide member for connecting the drive leader with the cartridge leader of the tape cartridge, and wherein the drive member is engageable with the engaging member for moving the engaging member with respect to the guide member.

12. The tape drive of claim 1 wherein upon connection of the drive leader with the cartridge leader, the take-up reel is rotatable to thereby draw the drive leader along a tape path of the tape drive.

13. The tape drive of claim 1 wherein the drive leader is configured to be wound onto the take-up reel.

14. The tape drive of claim 1 wherein the take-up reel is rotatable to wind the drive leader and cartridge leader thereon after the drive leader has been connected to the cartridge leader.

15. The tape drive of claim 1 wherein the drive leader comprises a flexible material.

16. A tape drive for use with a tape cartridge having a cartridge leader, the tape drive comprising:
    a drive body;
    a take-up reel supported by the drive body;
    a drive leader connected to the take-up reel, the drive leader being engageable with the cartridge leader;
    a leader connecting mechanism supported by the drive body for connecting the drive leader to the cartridge leader, the leader connecting mechanism including a guide member supported by the drive body and having a track, and an engaging member that is engageable with the drive leader and slidable along the track of the guide member for connecting the drive leader with the cartridge leader of the tape cartridge; and
    an elevator assembly for receiving the tape cartridge and for positioning the tape cartridge with respect to the drive body, the elevator assembly further being configured to actuate the leader connecting mechanism, wherein the elevator assembly includes a moveable drive member that is engageable with the engaging member for sliding the engaging member with respect to the guide members;
    wherein the drive leader is connected to the take-up reel prior to the drive leader being connected to the cartridge leader by the leader connecting mechanism.

17. The tape drive of claim 16 wherein the guide member has an additional track that has a generally linear configuration, and the drive member is moveable along the additional track.

18. A tape drive for use with a tape cartridge having a cartridge leader, the tape drive comprising:
    a drive body;
    a take-up reel supported by the drive body;
    a drive leader connected to the take-up reel, the drive leader being engageable with the cartridge leader;
    a leader connecting mechanism supported by the drive body for connecting the drive leader to the cartridge leader; and
    an elevator assembly for receiving the tape cartridge and for positioning the tape cartridge with respect to the drive body, the elevator assembly further being configured to actuate the leader connecting mechanism;
    wherein upon connection of the drive leader with the cartridge leader, the take-up reel is rotatable to thereby draw the drive leader along a tape path of the tape drive.

19. The tape drive of claim 18 wherein the drive leader comprises a flexible material and is configured to be wound onto the take-up reel.

20. The tape drive of claim 19 wherein the drive leader is connected to the take-up reel prior to the drive leader being connected to the cartridge leader by the leader connecting mechanism.

* * * * *